United States Patent [19]
Franke

[11] Patent Number: 5,826,171
[45] Date of Patent: Oct. 20, 1998

[54] MOBILE-RADIO SYSTEM WITH A RECONNAISSANCE DEVICE CONTAINED IN A BASE STATION

[75] Inventor: Erich Franke, Königsbach-Stein, Germany

[73] Assignee: Alcatel N.V., Rijswijk, Netherlands

[21] Appl. No.: 598,204

[22] Filed: Feb. 7, 1996

[30] Foreign Application Priority Data

Feb. 27, 1995 [DE] Germany .......................... 195 06 807.6

[51] Int. Cl.$^6$ .............................. H04B 1/06; H04M 3/22

[52] U.S. Cl. ..................... 455/26.1; 455/410; 455/411; 455/422; 379/34; 379/35

[58] Field of Search ................................. 455/26.1, 33.1, 455/33.2, 53.1, 54.1, 410, 411, 412, 422; 379/34, 35, 58, 59, 60

[56] References Cited

U.S. PATENT DOCUMENTS

| | | |
|---|---|---|
| 5,281,933 | 1/1994 | Chamberlin . |
| 5,428,667 | 6/1995 | Easterling et al. .......................... 379/59 |
| 5,537,460 | 7/1996 | Holliday, Jr. et al. ..................... 379/59 |
| 5,579,370 | 11/1996 | Fukushima et al. ....................... 379/34 |

FOREIGN PATENT DOCUMENTS

| | | | |
|---|---|---|---|
| 3415473 | 10/1985 | Germany .......................... | H04B 7/26 |
| 3423780 | 1/1986 | Germany .......................... | H04B 7/26 |
| 681409 | 3/1993 | Switzerland .................... | H04M 3/20 |

OTHER PUBLICATIONS

"Intelligent MTS Monitoring System" S. Yen, et al, pp. 185–187 Proceedings of the Annual International Carnahan Conference on Security Technology, Albuquerque, Oct. 12–14, 1994.
Patent Abstracts of Japan, vol. 005, No. 063 (E–054) Apr. 28, 1981 & JP 56 012165A (Fujitsu Ltd), Feb. 6, 1981.
"GSM Base Station System", J. Varin et al, *Electrical Communication*, 2nd Quarter 1993, pp. 155–163.
"Bundelfunk—Gestern, Heute, Morgen", E. Linder et al, ASCOM Technische Mitteilungen 3/4 .91 pp. 25–32.
M. Mouly et al, "The GSM System", 1992, pp. 88–109; Self–Published; Palaiseav, France; ISBN 2–9507190–0–7.
"D900 Mobile Communication System/System Description SYD A30808–X3231–X–2–7618", Siemens, Nov. 11, 1993, pp. 1–75.
"Mobile–Telefone/Die Post Hortmit", *Funkschau*, 14/1988, pp. 28–32.
"Testrategien, Messgerate und –Systeme im GSM—Teil 1", W. Rosar, *NTZ*, vol. 47, No. 9, 1994, pp. 654–658.
J. Biala, "Mobilfunk und Intelligente Netze", Friedr. Vieweg & Sohn Verlagsgesellschaft mbH/Braunschweig/Wiesbaden, 1994, pp. 66–68; 146–151; 188–194; 248; 304–305.

*Primary Examiner*—Bernarr E. Gregory
*Attorney, Agent, or Firm*—Ware, Fressola, Van Der Sluys & Adolphson LLP

[57] ABSTRACT

A mobile-radio system is disclosed in which it is possible to selectively monitor and interfere with calls. To this end, the base station includes an intercept device (5) whereby at least one traffic channel is can be intercepted, i.e., whereby transmissions on this channel can be intercepted or jammed. The intercept device (5) is connected to a baseband-processing portion (1).

8 Claims, 1 Drawing Sheet

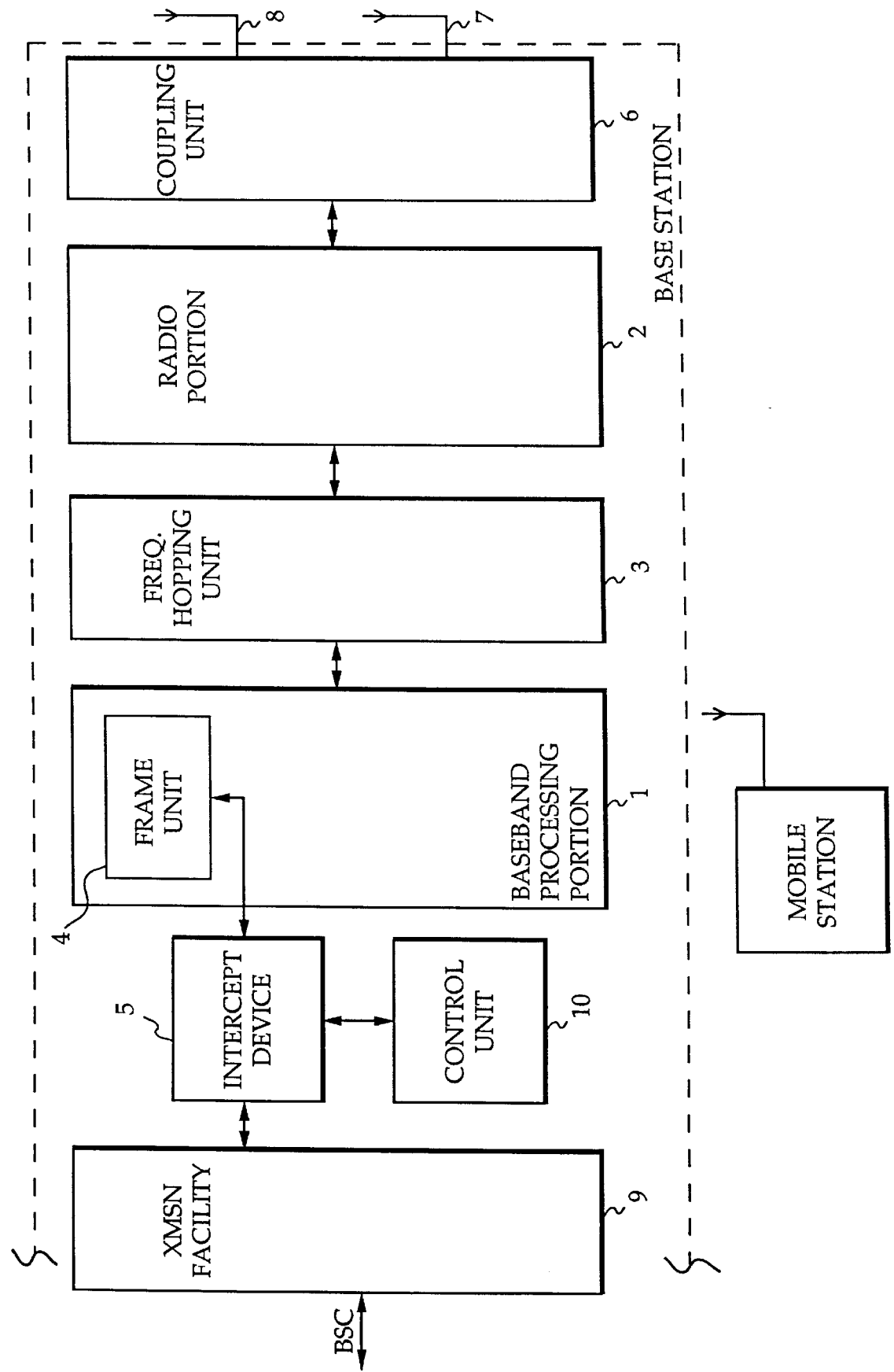

MOBILE-RADIO SYSTEM WITH A RECONNAISSANCE DEVICE CONTAINED IN A BASE STATION

TECHNICAL FIELD

The present invention relates to a mobile-radio system having at least one mobile station and at least one base station having a baseband-processing portion and a radio portion and to a base station for a mobile-radio system, the base station having a baseband-processing portion and a radio portion.

BACKGROUND OF THE INVENTION

A mobile-radio system which is designed in accordance with the GSM standard, for example, is known, for example, from a book by M. Mouly et al, "The GSM System for Mobile Communications", published by the author, ISBN 2-9507190-0-7, Chapter 2.1. Components of this cellular mobile-radio system and their operation are explained in that book in detail. The system components include base transceiver stations (BTS), base station controllers (BSC), a mobile services switching center (MSC), and mobile stations (MS).

A base station controller is a switching facility with data-processing capability. Its main functions include the management of the radio channels and the control of handovers. A base transceiver station comprises radio transmission and reception devices and all the signal-processing devices necessary for a radio interface.

A block diagram and a description of a base station are known, for example, from J. Varin et al, "GSM-Base Station System", *Electrical Communication* (Alcatel), 2nd Quarter 1993, pages 155 to 163. The block diagram, shown in FIG. 6, shows, among other things, a baseband-processing portion and a video portion. The baseband-processing portion has a frame unit and a baseband transmission and baseband reception processing portion. The radio portion has a carrier unit and a transmitter and receiver.

Another example of a mobile-radio system is a trunked system, which covers a limited area. Each Limited area forms an island. While conventional radio systems are generally channel-oriented, i.e., a relationship exists between user groups and radio channels, trunked radio systems use the existing channels for all users. In such a system, the channels are dynamically allocated to the connections, so that there is no fixed relationship between subscriber and radio channel. As a measure of a better utilization of the available radio channels as compared with a static allocation to user groups, a so-called trunk gain is defined. A survey of trunked radio systems is given by E. Linder et al, "Bundled Radio—Yesterday, Today, Tomorrow", ascom Technical Information ¾, 1991; and pages 25 to 32.

The increasing use of mobile telephones by the mass of the people entails an increasing use of such devices by criminal circles. The problem arises that it is impossible to monitor and interfere with conversations of persons belonging to such circles without bothering other mobile subscribers.

DISCLOSURE OF INVENTION

It is an object of the invention to provide a mobile-radio system wherein authorized persons can monitor and interfere with conversations without intruding upon mobile subscribers who are not involved in such conversations.

According to a first aspect of the present invention, a mobile-radio system comprising at least one mobile station and at least one base station which has a baseband-processing portion and a radio portion is characterized in that the base station comprises an intercept device whereby at least one traffic channel can be intercepted.

Another object of the invention is to provide a base station for such a mobile-radio system.

According to a second aspect of the present invention, a base station for a mobile-radio system wherein the base station has a baseband-processing portion and a radio portion, is characterized in that an intercept device is connected to the baseband-processing portion for intercepting at least one traffic channel.

One advantage of the invention is that a base station according to the invention can be brought into an observation area so that it will offer the best possible connection for all mobile telephones in that area.

These and other objects, features and advantages of the present invention will become more apparent in light of the detailed description of a best mode embodiment thereof, as illustrated in the accompanying drawing.

BRIEF DESCRIPTION OF THE DRAWING

The invention will now be explained in more detail with reference to a sole FIGURE. It is applicable both in cellular mobile-radio systems and in mobile-radio systems which do not have a cell structure. That being understood, the invention will be described in reference to a block diagram for a mobile-radio system including at least one mobile station and at least one base station for a cellular mobile-radio system.

BEST MODE FOR CARRYING OUT THE INVENTION

The sole FIGURE is a block diagram of a mobile-radio system having at least one base station for a cellular mobile-radio system which includes at least one mobile station. Such a cellular mobile-radio system is known (e.g., from M. Mouly et al), so that its structure and further system components need not be explained here. The block diagram shown corresponds to the block diagram in the article by J. Varin et al (FIG. 6 therein).

The base station has a transmitting antenna 7 and a receiving antenna 8 which are coupled to a radio portion 2 by means of a coupling unit 6. The radio portion 2 comprises a carrier unit, a transmitter, and a receiver, which are not shown in the FIGURE. The transmitter functions are modulation, conversion to a radio frequency, and power amplification, and the receiver performs down-conversion, analog-to-digital conversion, and calculation of the received signal strength.

A frequency-hopping unit 3, in which a frequency-hopping matrix is implemented, represents a link to a baseband-processing portion 1. This baseband-processing portion 1 includes a frame unit 4 which conditions signals to be transmitted and received signals, i.e., it forms TDMA frames, encodes and encrypts signals to be transmitted, and decodes and decrypts received signals. The frame unit 4 may consist of two or more units. A single frame unit contains all functions to perform digital baseband data processing for eight full-rate traffic channels. The baseband-processing portion 1 further includes a signaling unit and a baseband transmission processing and baseband reception processing unit. According to the invention, a reconnaissance or intercept device 5 is connected between a transmission facility 9, which is connected to a base station controller BSC, and the frame unit 4 contained in the baseband-processing portion 1. Between the frame unit 4 and the transmission facility 9, the signals are transferred as digital signals in several channels, so-called traffic channels. For each call (or each data transfer), one traffic channel is used. Connected to the intercept device 5 is a control unit 10, so that each traffic channel can be intercepted. The intercept device 5 has the following functions, for example:

It allows passive monitoring of all calls, which are switched to a special headquarters and/or recorded if required.

It allows selective introduction of false information into a traffic channel, e.g., a selected user will constantly hear a busy signal, for example.

If three base stations are employed, for example, the intercepted device allows a determination of the user's location with respect to these base stations, using a conventional hyperbolic fixing scheme, for example.

Besides speech signals, associated signaling information is processed in the baseband-processing portion 1. The signaling information includes, for example, the numbers of checked-in and active mobile subscribers (users) and a so-called mobile equipment identity number. The equipment identity number is permanently allocated to a mobile telephone and cannot be influenced by the mobile subscriber. With this signaling information an unambiguous association between call contents and mobile subscriber is possible.

The intercept device 5 is informed already during the establishment of a radio link which mobile station (equipment identity) is calling which subscriber number.

With a base station according to the invention it is possible to detect all mobile telephones in an observation area before a mobile subscriber makes a call. This allows a selection to be made from the mobile subscribers, so that the number of calls to be monitored can be reduced.

Since the intercept device 5 is connected between the transmission facility 9 and the frame unit 4, passive monitoring of conversations is possible. In the GSM standard, encryption of speech and data is only provided for the air interface.

The base station according to the invention can be installed in a vehicle, for example. A display screen may be connected to the control unit 10 to graphically present the information coming from the intercept device 5 (e.g., telephone numbers, subscribers' names, location of the subscriber). The base station can also be a fixed station. In that case, the control unit 10 is connected to a remote headquarters, for example.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A mobile-radio system comprising at least one mobile station and at least one base station which has a baseband-processing portion (1) and a radio portion (2), characterized in that the base station further comprises an intercept device (5) for intercepting at least one traffic channel.

2. A mobile-radio system as claimed in claim 1, characterized in that the intercept device (5) is connected to the baseband-processing portion (1).

3. A mobile-radio system as claimed in claim 2, characterized in that a control unit (10) is provided for connection to the intercept device (5) for controlling the intercept device (5) for said intercepting and for recording, jamming, interrupting or blocking transmissions on the traffic channel.

4. A mobile-radio system as claimed in claim 1, characterized in that a control unit (10) is connected to the intercept device (5) for controlling the intercept device (5) for said intercepting and for recording, jamming, interrupting or blocking transmissions on the traffic channel.

5. A mobile-radio system as claimed in claim 1, wherein the intercept device is for determining a user's location with respect to at least three base stations.

6. A base station for a mobile-radio system, said base station having a baseband-processing portion (1) and a radio portion 92), characterized in that an intercept device (5) is connected to the baseband-processing portion 91) for intercepting at least one traffic channel.

7. A mobile-radio system as claimed in claim 6, wherein the intercept device is for determining a user's location with respect to at least three base stations.

8. A base station for a mobile-radio system comprising at least one mobile station and at least one base station which has a baseband-processing portion (1) and a radio portion (2), characterized in that a control unit (10) is provided for connection to the reconnaissance device (5) for controlling the intercept device (5) for controlling said intercepting and for controlling recording, jamming, interrupting, or blocking transmissions on the traffic channel.

* * * * *

UNITED STATES PATENT AND TRADEMARK OFFICE
CERTIFICATE OF CORRECTION

PATENT NO. : 5,826,171
DATED : October 20, 1998
INVENTOR(S) : Franke

It is certified that error appears in the above-identified patent and that said Letters Patent is hereby corrected as shown below:

On the title page:
Item: [57] ABSTRACT, line 4 "is" should be deleted.

In Column 4, line 44 "the reconnaissance" should be --an intercept--.

In Column 4, line 47 "the" should be --at least one--.

Signed and Sealed this

Twenty-third Day of March, 1999

Attest:

Q. TODD DICKINSON

Attesting Officer

Acting Commissioner of Patents and Trademarks